United States Patent [19]

Kozlowski et al.

[11] Patent Number: 4,754,470

[45] Date of Patent: Jun. 28, 1988

[54] EXPOSURE ANTICIPATION CIRCUIT

[75] Inventors: Frank A. Kozlowski, Waukesha; James E. Blake, New Berlin, both of Wis.

[73] Assignee: General Electric Company, Milwaukee, Wis.

[21] Appl. No.: 828,629

[22] Filed: Feb. 10, 1986

[51] Int. Cl.⁴ .................... A61B 06/00; G03B 42/04; H05G 01/28; H05G 01/60
[52] U.S. Cl. .................................... 378/097; 378/098
[58] Field of Search ............... 378/091, 097, 098, 172, 378/173

[56] References Cited

U.S. PATENT DOCUMENTS

| | | | |
|---|---|---|---|
| 3,243,591 | 3/1966 | Lesnick et al. | 378/098 |
| 3,491,239 | 1/1970 | Dalman | 378/097 |
| 3,546,461 | 12/1970 | Craig | 378/097 |
| 3,783,286 | 1/1974 | Kremer | 378/098 |
| 4,464,779 | 8/1984 | Finkenzeller | 378/091 |

Primary Examiner—Craig E. Church
Assistant Examiner—T. N. Grigsby
Attorney, Agent, or Firm—James H. Beusse; Douglas E. Stoner

[57] ABSTRACT

A method and apparatus for reducing delay times between successive x-ray images in a medical x-ray diagnostic system in which delay times are a function of the time required to transport film in a camera apparatus. The camera is used to record images on an image display apparatus. The delay time is reduced by determining the time at which an image on the apparatus will reach a predetermined intensity level and initiating the camera film transport cycle at a predetermined time prior to the image reaching the predetermined intensity level. Apparatus is disclosed for determining the rate of image development and for providing a signal to initiate the camera film transport at a fixed time prior to completion of image development regardless of the rate of image development. The predetermined time period is selected such that actual film motion is not initiated until the image is fully developed on the image display apparatus.

14 Claims, 3 Drawing Sheets

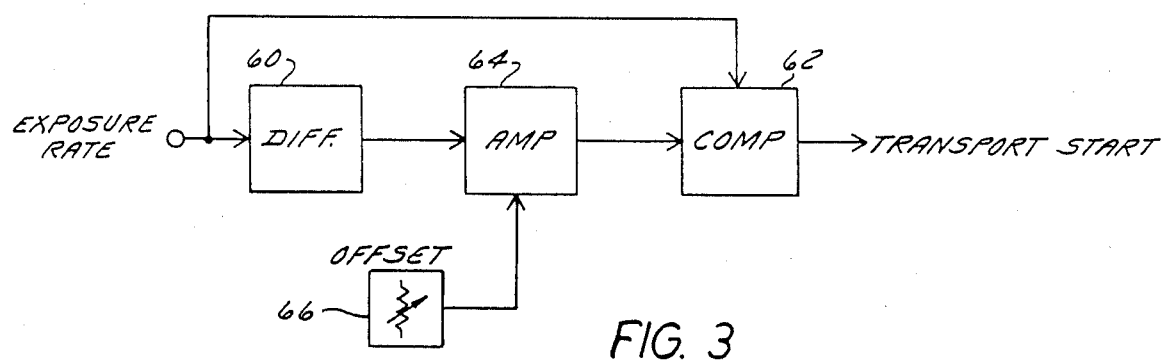
FIG. 3
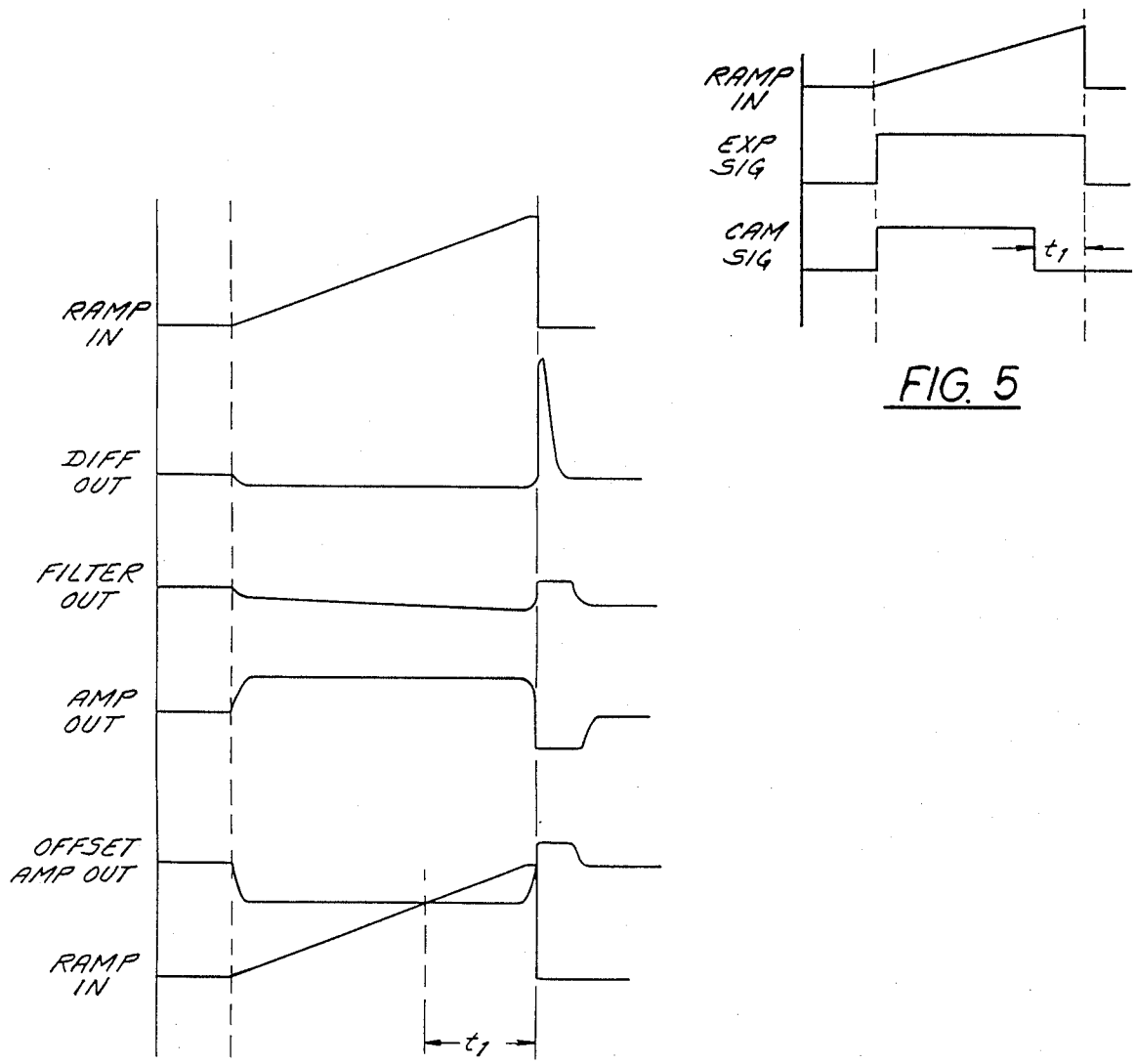
FIG. 5
FIG. 6

EXPOSURE ANTICIPATION CIRCUIT

BACKGROUND OF THE INVENTION

The present invention relates to a medical diagnostic method and apparatus for x-ray image presentation on a video monitor and, more particularly, to a method and apparatus for minimizing time delays between patient exposures due to camera film transport times.

In a typical imaging system used for medical diagnostics, primary imaging radiation, such as x-ray radiation which has been intensity modulated by passage through a patient, strikes an input screen of an image intensifier tube where it is converted to an electron laden image. Electrodes contained in the tube minify the image and accelerate the electrons toward a luminescent output screen of the image intensifier tube. An image having increased brightness is produced on the output screen in accordance with the spatial modulation of the x-ray radiation. A television camera and monitor are typically used to display the image. In addition, a photographic camera or cine camera is also used to record images of diagnostic interest.

High image quality, as measured by image resolution, contrast, and x-ray photon noise, is very desireable in such applications of an imaging apparatus. Typically, an intensity control system is provided in conjunction with the image intensifier tube for assuring that the intensity of a displayed image achieves a level established by a system operator. The level of intensity may be varied as a function of a desired contrast in order to allow an operator to view both low and high contrast images. Assuming that a level of intensity for the light output of the image intensifier tube is established at a fixed level, the rate at which that level of intensity is achieved is a function of the intensity of radiation applied to the patient and thus, may vary the exposure time of the patient to such x-ray radiation. Because the exposure time may vary, the time for the intensity level to reach the desired value will vary from exposure to exposure. Exposure times normally run for fractions of a second, for example, less than 400 milliseconds. In order to increase the rate at which film images can be generated so that higher frame rates can be achieved and not be unduly limited to short exposure times, it is desireable to reduce the delay time associated with film transport in the camera. That is, the camera frame rate becomes a limiting factor in determining the highest exposure frame rate and that limit tends to be established by the time required between frames, or more particularly, the film transport time. However, such film transport times are normally fixed times determined by how much time is required to perform the mechanical functions associated with film transport. For example, shutter opening and closing, opening of the film supply magazine port and removal of the next film, and moving the exposed frame are mechanical functions which require finite processing times.

Accordingly, it is an object of the present invention to provide a method and apparatus for higher frame rates in a camera.

It is another object of the present invention to reduce the delay time between successive camera frame exposures.

It is a still further object of the present invention to provide a method and apparatus for anticipating an end of a medical x-ray exposure.

SUMMARY OF THE INVENTION

The above and other objects are achieved in a medical x-ray diagnostic system having a video image display apparatus and a photographic film recording apparatus. A method and apparatus for reducing delayed time due to film transport between and end of one film frame exposure and the beginning of a subsequent film frame exposure includes intensity monitoring apparatus for monitoring the rate of intensity development of an image on a video imaging system. The system includes a control apparatus for causing development of the intensity on the imaging apparatus to terminate at a predetermined intensity level. The rate at which the image intensity is developed is determined such that a time prior to the time at which the image intensity reaches its predetermined level can be identified. At the predetermined time prior to image intensity development, camera film transport is initiated such that film motion will occur concurrently with the termination of exposure and intensity reaching its predetermined level. In this manner, the film transport cycle is started prior to the previous exposure being completed to minimize time between exposures necessary to complete the film transport cycle. Initiating the film transport cycle prior to an image being completed does not degrade the image since the first part of the transport cycle opens the supply magazine for film and begins removal of a next film to be exposed. The system thus anticipates completion of one exposure and initiates film transport such that actual exposure termination occurs concurrently with removal of the exposed film.

BRIEF DESCRIPTION OF THE DRAWINGS

For a better understanding of the present invention, reference may be made to the following detailed description taken in conjunction with the accompanying drawings in which:

FIG. 3 is a simplified block diagram of one form of the present invention;

FIG. 5 is a time diagram of input and output signals for the circuit of FIG. 4; and FIG. 6 is a diagram of waveforms generated in the circuit of FIG. 4.

DETAILED DESCRIPTION

Figure 1:
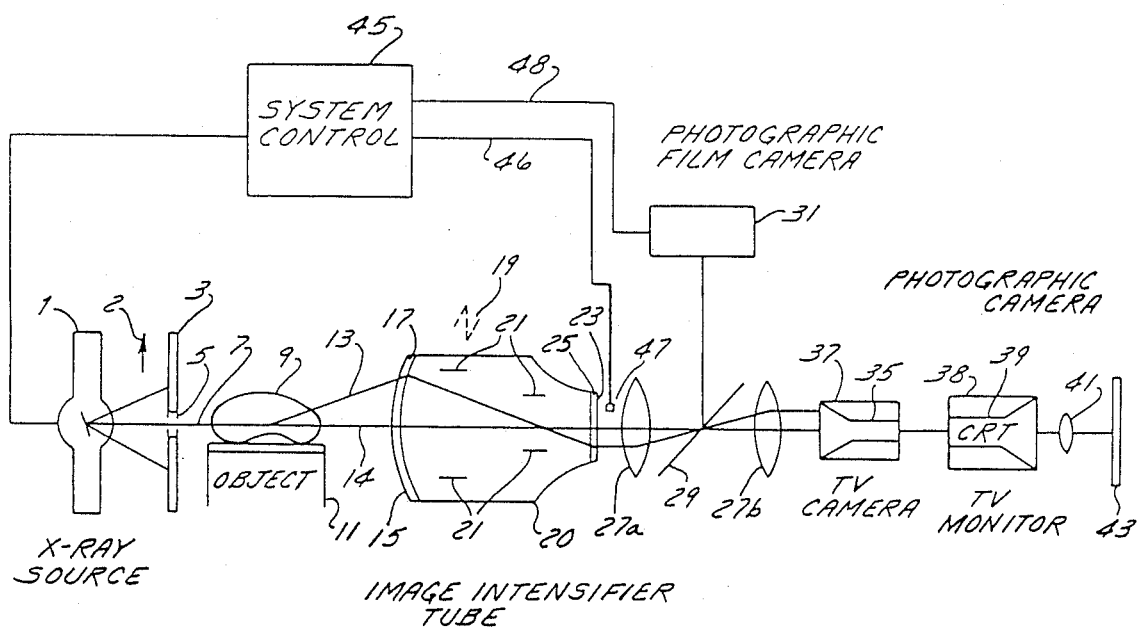
FIG. 1 is a simplified functional block diagram of a medical x-ray system with which the present invention is particularly useful.

FIG. 1 illustrates schematically an imaging apparatus including a photographic film camera for recording x-ray images. The apparatus includes an x-ray source 1, a table 11 for supporting a patient 9, an image intensifier tube 19, a conjugate lens pair 27A and 27B, a television camera 37 and a cathode ray tube (CRT) 39 with a television monitor 38 for displaying a television image. A photographic film or non-synchronous cine image camera 31 is included to photograph directly images produced on an output screen 25 of the image intensifier tube 19. To this end, a dichoric mirror 29 is provided between lenses 27A and 27B. Mirror 29 is angled to divert a portion of optical wave length radiation toward camera 31 while allowing the remainder of the optical wave length radiation to reach TV camera 37. The imaging apparatus may further include a photographic camera 43 for photographing an image on a CRT 39 with the aid of a lens 41. The apparatus additionally includes an x-ray field limiting device 3 composed of a radiation opaque material, such as lead, having an opening 5 formed therein. Device 3 is positioned between x-ray radiation source 1 and a patient 9 and is adapted to collimate the x-ray radiation from x-ray source 1 so as to define the irradiated area of the patient 9.

Image intensifier tube 19 is comprised of an evacuated envelope 20 having a faceplate 15 and an output window 23. Primary x-ray imaging radiation 14 having passed through patient 9 impinges on input screen 17 situated on the inner surface of faceplate 15 where it is converted by phosphor and photocathode element (not shown) into an electron latent image. A plurality of internally positioned electrodes, such as electrode 21, focus and accelerate the electrons toward a flourescent output screen 25 located within the image intensifier tube adjacent to output window 23 so as to minify and produce an intensified image thereon. The electrons excite the phosphor in the flourescent screen to emit a quantity of optical wave length photons in proportion to impinging electron energy and density. In this manner, radiation differentially attenuated in accordance with the internal anatomical features of patient 9 is displayed as an optically detectable image at output screen 25.

A computerized control system 45 is a standard part of the apparatus of FIG. 1. The control system includes means for controlling the various elements forming a part of the image generating system. For example, the control system provides a signal to the x-ray source 1 to initiate generation of x-rays and to terminate such x-rays after a predetermined time interval has lapsed. For purposes of this discussion, only the control lines for sensing the image intensity of an image generated on faceplate 25 of image intensifier tube 19 and for controlling operation of the photographic film camera 31 is of interest. The control line 46 is connected to an optical intensity sensing device 47. The device 47 provides an output signal representative of the intensity of the image on faceplate 25. The control line 48 is connected to the photographic film camera 31 to provide a signal to the camera to initiate exposure and film transport cycles. A description of one form of intensity sensing device 47 and control system for used with such device is given in copending patent application Ser. No. 761,439 filed Aug. 1, 1985 entitled FILM WRITING SYSTEM WITH CLOSED LOOP CONTROL FOR ELECTRONIC IMAGES, which application is assigned to the assignee of the present invention. As described in this co-pending application, the control system continuously senses the intensity of the image developed by the image intensifier 19 and adjusts the operation of the system to assure that the image intensity for a given subject density is always driven to the same intensity level.

In the operation of the system of FIG. 1, the control system 45 provides a signal to x-ray source 1 to initiate generation of x-rays. The x-rays pass through the object 9 and are sensed by an image intensifier tube 19. The tube 19 converts the sensed x-ray to an image on the faceplate 25. The sensing device 47 periodically monitors the intensity level of a known image generated on the faceplate 25 and provides a signal to the control system 45 which enables the control system 45 to regulate the exposure time by controlling the x-ray source 1 so as to achieve a desired image intensity on the faceplate 25. This setting of image intensity level is normally achieved during a calibration cycle and not during an object imaging cycle. The image displayed on the faceplate 25 is processed through the conjugate pair of lenses 27A and 27B and received by the TV camera 37. The image generated by the TV camera 37 is transmitted to the TV monitor 38 for viewing. The photographic camera 43 provides a means of selectively photographing the image displayed on the TV monitor 38. The image on plate 25 of the tube 19 is also split off by mirror 29 and photographed by film camera 31. The operation of camera 31 is controlled by line 48 from the system control 45. As is well known, the length of time that the image remains on the image intensifier tube 19 is relatively short. The image builds up to its regulated level and then decays very rapidly. The operation of filming camera 31 must be coordinated with the display of an image on faceplate 25 so as to provide a record of the displayed image. In most systems, it is desireable to obtain multiple exposures of the object 9 over a very short time span in order to eliminate any artifacts in the image which may be caused by motion of the object 9. For example, if the object 9 is a person, motion artifacts may be created by breathing motion, vascular motion or by physical motion of some other type associated with the person. By reducing the exposure time and delayed time between consecutive exposures, the motion artifacts can be minimized. However, the rate at which exposures can be taken is limited by the rate at which the camera 31 can accept and process film images. More particularly, the camera 31 limits the rate at which new exposures can be generated as a function of the time required to open and close a shutter, advance film and insert a new film section in position to receive an image from the faceplate 25.

·In one form of photographic film or camera, the manufacturer has incorporated a fixed or constant transport time, that is the time required between consecutive exposures. Typically, such a time may run in the order of 120 milliseconds. For example, the camera used in the ANODICA 6 camera system available from Oldelft Corporation of America, utilizes a 120 millisecond constant transport time. This type of camera is a photo spot camera which utilizes 100×100 millimeter polyester film contained in 50 film cassettes or magazines. In this camera, the film cassette is loaded into the magazine and the camera automatically withdraws each film from the magazine and places it in the lens assembly while advancing the previously exposed film. The process may in some respects be compared to the operation of a Polaroid type SX-70 camera which also includes automatic film advance. Thus, it will be appreciated that there is a finite delay or transport time between the times at which a film in the camera may be exposed. Since the time delay or transport time between exposures is a function of the mechanical operation of the camera, any reduction of this time delay will require redesign of the mechanical operation of the camera system. Accordingly, it is not a practical solution to attempt to minimize the time delay by changing the mechanical constraints of the system. However, the time between exposures can be reduced if the end of one exposure can be anticipated such that a portion of the mechanical operation of the camera can be initiated while the camera is still accepting an image from the present exposures. Applicants have therefore developed a method and apparatus for anticipating the end of one exposure and for providing a control signal to the camera 31 for initiating mechanical functions of the camera prior to the end of a present exposure.

Figure 2:
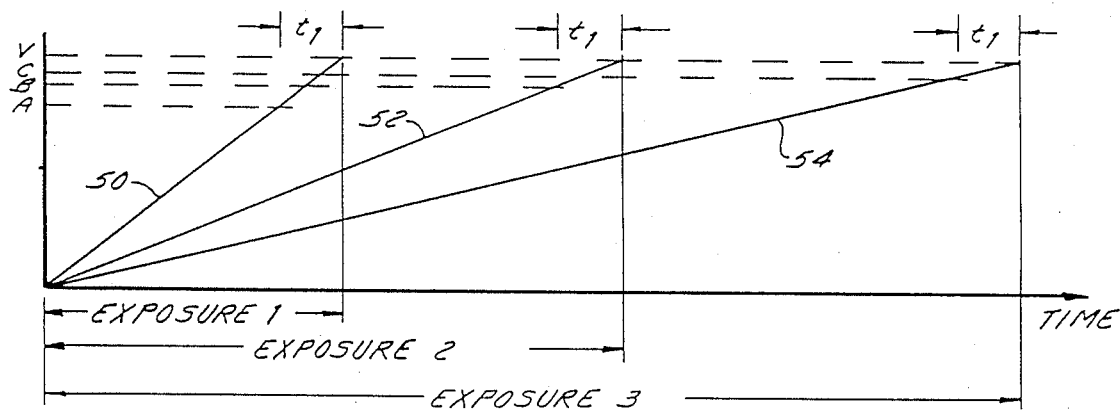
FIG. 2 is a time base diagram of various exposure times necessary to achieve a predetermined intensity level or an image intensifier tube for different levels of irradiating radiation.

Referring now to FIG. 2, there is shown a diagram illustrating the timing relationship for three different exposure times, all of which terminate at the same intensity level. The intensity level within the control circuitry equates to a fixed voltage level established by the intensity control circuit associated with the intensity sensor 47. Because the rate at which each of the different exposures increases to the predetermined intensity level varies, the voltage level on the wave from corresponding to a predetermined time delay before the end of the exposure will likewise vary. For example, with regard to exposure number one, the predetermined time period is initiated when the ramp function 50 crosses threshold level at voltage A. For purposes of description, the predetermined time period as listed as T1. For a longer exposure time shown as exposure two and illustrated as ramp function 52, the predetermined time period T1 is established when the ramp function 50 crosses the voltage level inidicated at B. Similarly, for an even longer exposure time three, indicated by ramp function 54, the predetermined time period T1 occurs when the ramp function crosses the voltage indicated at value C. It will be appreciated, although the time period T1 remains constant, the voltage level of the ramp function at the time T1 prior to the end of an exposure varies as a function of the slope of the ramp which in turn is a function of the length of the exposure. A predetermined time period T1 is selected such that a signal supplied to the camera 31 at that time period prior to the end of an exposure will allow the mechanical transport function to start without affecting the present film exposure. For the ANODICA 6 camera, the preset transport time is 120 milliseconds and the predetermined time period T1 can be set to one-third of the transport time or 40 milliseconds. This time period is permissable as a preset start time for transport since the first one-third of the transport time is used to open the supply magazine port and to start the removal of a next film for exposure. During this first one-third of the transport cycle, the image being impressed on the existing film is not degraded since the existing film does not begin to move.

Referring now to FIG. 3, there is shown a simplified diagram of one circuit for anticipating an end of exposure and for generating a signal at a predetermined time before the end of such exposure. An exposure rate signal corresponding to the ramp function such as functions 50, 52 and 54 is applied to an input terminal of a differentiator 60 and to a first input terminal of a comparator 62. The differentiator 60 converts the ramp function signal to a DC voltage level at an amplitude proportional to the slope of the ramp function. The DC level signal developed by differentiator 60 is applied to an amplifier 64. The amplifier 64 is supplied with a voltage offset signal from an adjustable source 66. In addition to amplifying the DC level signal from differentiator 60, the amplifier 64 offsets the signal by an amount determined by the voltage from the offset source 66. By adjusting the offset source 66, the amplifier output can be varied as desired. The output signal developed by the amplifier 64 represents the voltage levels A, B and C shown in FIG. 2. It the input ramp signal corresponds to the ramp function 50 and the offset corresponds to the time T1, then the output of the amplifier 64 will correspond to the value of voltage indicated at A. The voltage value developed by the amplifier 64 is then applied to a second input terminal of the comparator 62. When the amplitude of the ramp function signal applied to the first input terminal of comparator 62 exceeds the value of the DC voltage level applied to the second input terminal from the amplifier 64, the comparator will change state and produce an output signal of a polarity sufficient to initiate a transport start signal for application to the camera circuit. Thus, the block diagram illustrated in FIG. 3 is one embodiment of an apparatus for anticipating the end of an exposure cycle and for initiating a transport start signal for the camera a predetermined time period before the end of the exposure cycle.

Figure 4:
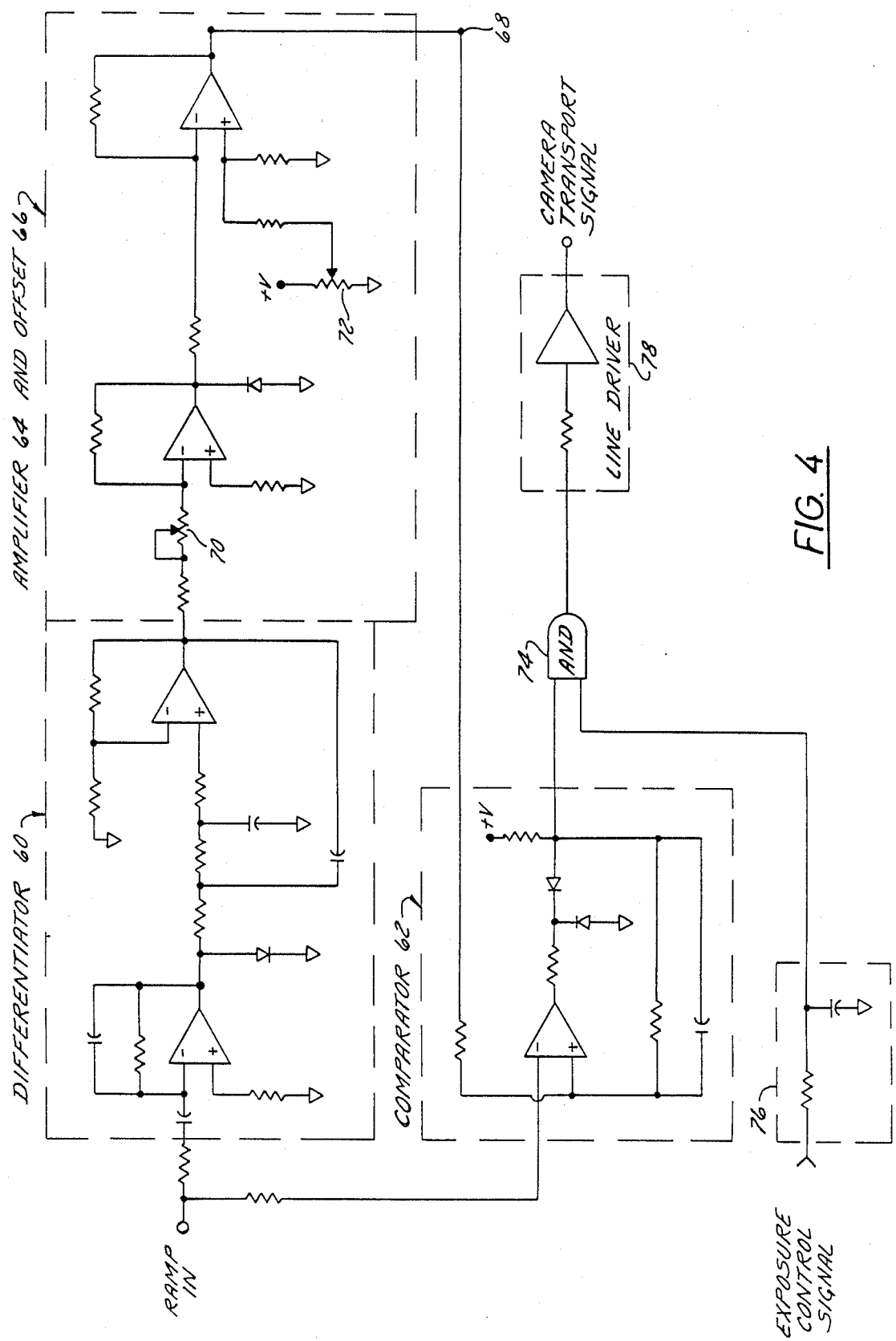
FIG. 4 is a detailed schematic diagram of the block diagram of FIG. 3.

Referring now to FIG. 4, there is shown a detailed schematic diagram of one embodiment of the block diagram of FIG. 3. The differentiator 60 is seen to comprise an operational amplifier connected as a differentiator followed by a second operational amplifier connected in a filtered arrangement. Those skilled in the art will recognize the filter arrangement as being a typical Butterworth filter with the components selected to provide a second order value response. An understanding of the circuit in FIG. 4 may best be had by consideration of the signal diagrams shown in FIG. 6. In FIG. 6, the ramp input signal applied to the differentiator 60 is shown as a substantially linear ramp signal. The differentiator circuit per se within differentiator circuit 60 produces an output signal identified as "DIFF OUT" in FIG. 6 which has some noise riding on the signal and also has a substantially sharp peak at the point at which the ramp signal rapidly decays from its maximum value pack towards its quiescent value. The Butterworth filter strips the noise from the output signal differentiator and also holds the top of the differentiator output signal relatively flat and clamps off the spike signal developed when the ramp signal reverts to its quiescent value. The output signal from the differentiator 60 indicated as the filter out signal is applied to the amplifier 64 and an offset circuit 66. The amplifier 64 inverts the filter out signal and amplifies it to a higher level. This is shown as "AMP OUT" signal in FIG. 6. The offset amplifier again inverts the amplifier signal but shifts the level so that the quiescent value for the offset amplifier out signal at terminal 68 is at an amplitude equal to the peak amplitude at the ramp input signal. In essence, the offset amplifier 66 acts to establish a threshold level for the amplifier output signal. The time T1, that is the time between the point at which the amplitude of the ramp signal exceeds the amplitude of the signal from the offset amplifier 66, can be set by adjusting the gain of the amplifier 64 such as by, for example, using the potentiometer 70. The offset value is similarly adjusted by setting the potentiometer 72.

The comparator 62 is seen to comprise an operational amplifier connected in a comparator configuration having an inverting input terminal connected to receive the ramp end signal and a non-inverting input terminal connected to receive the output signal from the offset amplifier 66. When the ramp end signal becomes more positive than the signal from the amplifier 66, the comparator 62 will change states and output a signal in the embodiment illustrated which is in essence a logical zero value. For controlling the camera 31, the output signal from the comparator 62 is ANDed in a logical AND circuit 74 with an exposure control signal generated by the control system 45. The exposure control signal determines the time period during which a single exposure occurs. This signal is coupled through an RC filter network 76 to a second input terminal of the AND gate 74.

Referring to FIG. 5, it can be seen that the exposure signal occurs in a time sequence during which the ramp input signal occurs. This is so since the exposure signal controls the operation of the x-ray source and the ramp end signal represents the intensity build-up on the image intensifier tube created by receipt of x-rays passing through the object 9. In order to generate the camera transport signal for causing the camera 31 to start preparation for a second exposure prior to the time of the first exposure is completed, the signal from the comparator 62 is ANDed with the exposure signal and the logic gate 74. As can be seen in FIG. 5, when the comparator 62 switches states its output signal reverts to a logic zero level, the output signal generated by the AND gate 74 which becomes the camera transport signal is similarly driven to a logic zero state. The time at which the camera transport signal goes from its logic one to its logic zero state is selected as described previously and functions to initiate the mechanical functions necessary to reduce the transport time within the camera 31. The line driver circuit 78 merely provides sufficient drive to the logic signal from the AND gate 74 for use as a signal to control the camera 31.

It will be appreciated that what has been described is a novel method and apparatus for reducing the time between subsequent exposures in a medical x-ray system by initiating a film transport cycle prior to the time that present exposure has ended. The invention particularly provides a method and apparatus for anticipating an end of an exposure and for generating a camera transport cycle at a predetermined time before the end of the exposure cycle. Accordingly, the circuit functions as an end of exposure anticipation circuit. While the invention has been described in what is presently considered to be a preferred embodiment, modifications, adaptations and variations will become apparent to those skilled in the art. It is intended therefore, that the invention be interpreted within the full scope of the appended claims and not limited by the embodiment described.

We claim:

1. In a medical x-ray diagnostic system comprising an x-ray source having an image display apparatus and a photographic film recording apparatus for recording a plurality of successive frames of a displayed image on corresponding frames of film, a system for reducing delay time due to film transport between an end of one film frame exposure and a beginning of a subsequent film frame exposure comprising:
   means for sensing image development to a predetermined intensity level on the image display apparatus;
   means for determining the rate of image intensity development;
   means responsive to the rate of image intensity development for sensing a predetermined time prior to image intensity reaching the predetermined level; and
   means for initiating a camera film transport cycle at said sensed predetermined time, said predetermined time being selected such that film motion is initiated concurrently with a termination of an exposure.

2. The system of claim 1 wherein said image sensing means comprises an optical intensity monitor positioned to receive optical energy from the display apparatus and for generating an output signal representative of instantaneous intensity levels on said apparatus.

3. The system of claim 2 wherein said rate determining means comprises means for converting said signal from said monitor to a value representative of the rate of change of said monitor signal.

4. The system of claim 3 wherein said converting means comprises a differentiator.

5. The system of claim 4 and including an amplifier with offset for setting the level of said value to a second value corresponding to a signal level to be achieved by said monitor signal a predetermined time prior to an end of an exposure.

6. The system of claim 5 and including means for comparing said monitor signal to said second value for generating a signal for initiating said film transport cycle when said monitor signal exceeds said second value.

7. In an x-ray system comprising an x-ray source, an end of exposure anticipation system for generating a control signal a predetermined time prior to an end of an exposure, the end of exposure corresponding to a predetermined image intensity level and wherein said image reaches the predetermined intensity level by a linear intensity variation, the system comprising:
   means for monitoring the image intensity level and for providing a time varying signal representative of instantaneous intensity variations;
   means for converting said time varying signal to a fixed value signal representative of the rate of change of said time varying signal;
   means for adjusting said fixed value signal in proportion to the desired time interval between the end of exposure and generation of said control signal; and
   means for comparing said time varying signal and said adjusted fixed value signal and for generating said control signal when said time varying signal achieves a value greater than said adjusted fixed value signal.

8. The system of claim 7 wherein said time varying signal represents a ramp function, said means for converting said time varying signal to a fixed value signal comprising a differentiator.

9. The system of claim 8 and including filter means in said differentiator.

10. The system of claim 9 wherein said filter means comprises a Butterworth filter having a second order value.

11. A method for reducing delay times between successive x-ray images in an x-ray diagnostic system comprising an x-ray source in which delay times are a function of film transport cycle times associated with recording of images from an image display apparatus to film, the method comprising the steps of:
   (a) sensing image development to a predetermined intensity level on the image display apparatus;
   (b) determining the rate of image intensity development;
   (c) determining from the rate of image intensity development a predetermined time prior to image intensity reaching the predetermined level; and
   (d) initiating a camera film transport cycle at said sensed predetermined time, said predetermined time being selected such that film motion is initiated concurrently with the intensity level reaching the predetermined intensity level.

12. The method of claim 11 wherein the step of sensing image development comprises the sub-steps of:
   positioning an optical energy sensing device proximate the image apparatus; and
   obtaining from the optical energy sensing device a signal representative of instantaneous intensity variations of said imaging apparatus.

13. The method of claim 12 wherein the step of determining the rate of image intensity development comprises differentiating the signal from the optical intensity sensor for developing a fixed value signal representative of the rate of change of the time varying signal.

14. The method of claim 13 wherein the step of determining a predetermined time comprises the sub-steps of:
   adjusting the fixed value signal in proportion to the desired time interval between the intensity reaching the predetermined intensity level and the initiation of a film transport cycle; and
   comparing the time varying signal and the adjusted fixed value signal for generating a signal to initiate the film transport cycle when the time varying signal achieves a value greater than the adjusted fixed value signal.

* * * * *